United States Patent [19]
Lindmark

[11] Patent Number: 6,011,614
[45] Date of Patent: Jan. 4, 2000

[54] INSTRUMENT AND METHOD FOR MEASURING A PERIODIC MOTION

[76] Inventor: Curt Lindmark, Byvägen 75, 832 45 Frösön, Sweden

[21] Appl. No.: 09/174,596

[22] Filed: Oct. 19, 1998

Related U.S. Application Data

[63] Continuation of application No. PCT/SE96/00521, Apr. 19, 1996.

[51] Int. Cl.⁷ .................................................... G01P 3/40
[52] U.S. Cl. ............................................................ 356/23
[58] Field of Search ............................... 356/23, 25, 28, 356/373; 348/132

[56] References Cited

U.S. PATENT DOCUMENTS

| | | | |
|---|---|---|---|
| 4,498,868 | 2/1985 | Schuss | 433/29 |
| 4,600,300 | 7/1986 | Rotello | 356/23 |
| 5,029,987 | 7/1991 | Shinomiya | 350/340 |
| 5,267,067 | 11/1993 | Wiget | 359/85 |
| 5,341,435 | 8/1994 | Corbett et al. | 382/1 |

FOREIGN PATENT DOCUMENTS

| | | |
|---|---|---|
| 56-24317 | 3/1981 | Japan . |
| 6-34690 | 2/1994 | Japan . |
| 503863 C2 | 4/1996 | Sweden . |
| WO81/02795 | 10/1981 | WIPO . |

*Primary Examiner*—Richard A. Rosenberger
*Attorney, Agent, or Firm*—Burns, Doane, Swecker & Mathis, L.L.P.

[57] ABSTRACT

The invention concerns an instrument (50) and a method for measuring an essentially periodic motion, which has a first average frequency, of an object (10). An image of the object (10) is produced by means of an optical window (30), which comprises liquid crystals (31) to be electrically controllable between different states of transmission. A periodic transmission change, corresponding to the periodic motion, of the optical window (30) between a state with relatively low transmission and a state with relatively high transmission is accomplished, such that the motion of the image (B) obtains a second average frequency, which is lower than the first average frequency. By means of an electronic image-analysing means (20), the image (B) of the periodic motion of the object (10) is received via the optical window (30), and an indication is made to show when the second average frequency falls below a predetermined value.

23 Claims, 1 Drawing Sheet

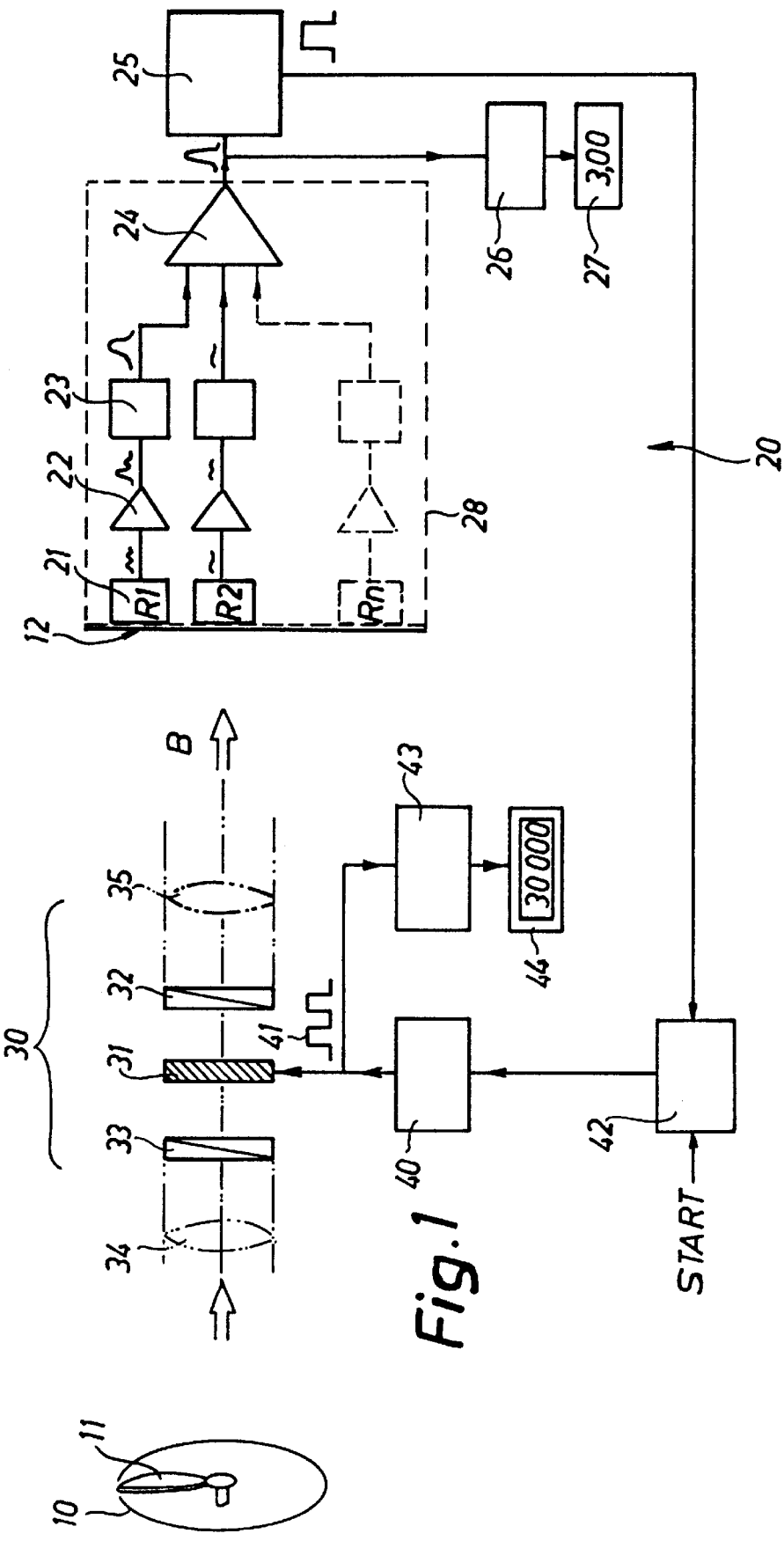

INSTRUMENT AND METHOD FOR MEASURING A PERIODIC MOTION

This is a continuation of International Application No. PCT/SE96/00521, filed Apr. 19, 1996, that designates the United States of America.

The present invention relates generally to an instrument and a method for optically measuring a periodic motion, in which use is made of a transmission change of an optical window comprising liquid crystals.

The expression "measuring a periodic motion" should be considered to comprise cases, where a measured value is obtained, corresponding to the periodicity of the motion, for instance a speed or a frequency, but also cases, where a numerical measured value is not obtained, for instance if the measuring operation merely serves to identify whether there is a periodicity or to establish whether the periodic motion is related to some other periodic course.

A prior art device for measuring a periodic motion of an object is disclosed in U.S. Pat. No. 4,600,300. The object is observed ocularly through an optical window having a layer of liquid crystals, the transmission of which may be varied at an optional rate. This rate is set such that the observed object seems to be stationary. The rate then corresponds to the frequency of the periodic motion.

This prior art technique suffers from the drawback that it requires the user to determine ocularly when the motion of the object stops. In many conceivable applications, this is impossible owing to the lack of space for the head, or inconvenient owing to the risk of injuries, for instance in connection with rotating machines. Moreover, it is complicated to perform repeated measurements on the same object, which is often necessary for, for instance, determining various statistic relations or when the periodic motion does not have an exact periodicity but varies about an average values.

One object of the present invention therefore is to provide an instrument and a method for measuring periodic motions, which do not suffer from the above drawbacks.

A further object of the invention is to provide an instrument and a method for measuring periodic motions, both rotary and linear, in which it should be possible to perform the measuring operation for very high frequencies.

These and other objects are achieved by an instrument and a method having the features stated in the claims, preferred embodiments being defined in the dependent claims.

An instrument according to the invention, as defined in claim 1, is capable of measuring not only a strictly periodic motion but also an essentially periodic motion, i.e. a motion whose period has a certain variation. This is achieved above all by the threshold value being selectable not only to be zero but to be an optional value differing from zero. That detected then is the average period or average frequency of the motion. This is a considerable advantage compared with the manual ocular technique as disclosed in the abovementioned U.S. Pat. No. 4,600,300.

The use of the optical window makes it possible to optically process, in real time, the received optical measuring signal without first having to change it to an electric signal.

A further distinguishing feature of both the instrument and the method according to the invention is that the measuring operation can be carried out not only in the visible field but also in the UV and IR field and thus also in darkness.

Moreover, the instrument can be provided with means for indicating the changing frequency or frequencies, at which the second average frequency falls below the predetermined value. As a result, the user may easily directly read the periodicity of the motion of the object, either indicated directly as frequency or converted into some other quantity, for example revolutions per minute.

The invention thus allows direct observation in real time of a periodic motion, both rotary and linear, and also combinations thereof. In addition to the speed of rotating motions, the invention can be used to measure, among other things, time of period, speed of motion and time of interval.

It is also possible to measure a distance of motion by using the measuring method according to the invention. This applies to a rotating motion, such as a wobbling shaft, as well as a reciprocating linear motion, e.g. a vibrating pin, beam, antenna, mast etc.

By using the LCD technique described in U.S. Pat. No. 4,600,300, it is possible to measure slow courses only, some twenty or thirty Hz at most. Besides, LCD crystals have slow transition edges, which results in an indistinct image However, in accordance with advantageous embodiments of the invention, it is possible to measure very fast courses, such as >10 million revolutions per second. For measuring of comparatively slow courses, relatively slow liquid crystals, such as dispersive and/or TN-type (twisted nematic) crystals, are applicable. Such crystals, however, will not fully yield the "ustroboscope effect" which is characteristic of faster transmission changes. It is therefore preferred to use fast liquid crystals, such as ferroelectric or paraelectric, smectic liquid crystals, especially C*-type or A*-type materials.

The production and construction of such electro-optical cells that can be used for the optical window are per se known to those skilled in the art and therefore need not be described in detail. The window may contain one or more electro-optical cells (EO cells) with surrounding polarisers. An EO cell usually consists of a liquid crystal enclosed between two plane-parallel plates made of e.g. glass and arranged at a small accurate distance from each other. On these plates, transparent electrode layers are arranged, over which the control signal for the transmission change is applied. By periodically changing the voltage across the crystal layers, the transmission of the cell changes in a manner that is per se known. Moreover, it is possible to use EO cells made of polymer.

It should be observed that for the function of the invention it is not always necessary to control the EO cells completely. For the measurement, it is sufficient that the transmission difference between the relatively low and the relatively high transmission is enough to make the average frequency of the motion in the image identifiable. It will therefore be appreciated that the liquid crystals can in fact be controlled at a frequency which is so high that the crystals do not have time to take their "end positions". This can also be expressed by saying that one operates on the transition edges of the cells. In other words, it.is possible to control the EO cells at frequencies which are normally not acceptable in other fields of use for liquid crystals, such as LCD.

These and other advantages of the invention will be more apparent from the following description of a schematically illustrated embodiment of an instrument for carrying out a measurement according to the invention.

FIG. 1 explains the measuring principle according to the invention and shows a block diagram of a preferred embodiment of an inventive instrument.

FIG. 2 shows schematically the image of the object in the image plane where photoelements are arranged.

FIG. 1 shows a rotating test object 10 which is illuminated by ambient light and which here is in the form of a wheel having only one spoke 11. An image B of the test object 10 is produced by means of an optical window 30, which comprises one or more electro-optical cells 31 and surrounding polarisers 32, 33, of which one or both can be turnable for controlling of contrast. In front of or behind the window 30, optics 34, 35 may optionally be available for studying the test object at a great distance or very small test objects or motions. In this embodiment, the cells 31 are assumed to contain ferroelectric liquid crystals for obtaining a good contrast and a possibility of measuring fast courses. The image B of the test object is caught in an image plane 12 by an image-analysing means or image analyser 20.

A means for altering the frequency of the tranamission change, in this case a sweep generator 42, is connected via a driving circuit 40 to the cell 31 of the optical window 30. The output of the driving circuit 40 is also connected to a frequency counter 43, which in turn is connected to a display 44.

The blocks in the block diagram of the image analyser 20 should be seen as representations of functions which are included in this embodiment of the image analyser 20. These can be optionally realised by the expert as physical, analogue or digital, components. It is also possible to realise some of them in the form of software. The image analyser 20 has two main elements, a detector 28 and a signal processor 25. The detector 28 comprises a photodetector 21 having at least one photoelement. In this embodiment, there are n photoelements F1, F2, . . . Fn. As shown in FIG. 2, these are uniformly distributed in the image plane 12. The photoelements F1–Fn are each connected to an amplifier 22, which in turn is connected to its own low-pass filter 23 in a means 23 for low-pass filtration. The low-pass filters 23 are jointly connected to a summation amplifier 24, whose output is connected to the signal processor 25 and a second frequency counter 26. The output of the signal processor 25 is connected to the sweep generator 42. A second display 27 is connected to the second frequency counter 26.

The measuring operation is carried out as follows. The sweep generator 42 is started and begins to sweep from a start frequency, for instance 0 Hz, upwards in frequency. Via the driving circuit 40, whose output signal is shown schematically at 41, a transmission 35 change of the optical window 30 is accomplished, i.e. the transmission of the optical window 30 is shifted between two different levels. The frequency signal 41 is supplied to the frequency counter 43 and the frequency is shown on the display 44.

Now assuming that the test object has a certain rotary frequency, which is referred to as the first average frequency. The increasing transmission change frequency results in a more and more slowly rotating image B of the object 10, The rotary frequency of the image B is referred to as the second average frequency. The second average frequency constitutes the difference between the 10 rotary frequency of the object 10 and the transmission change frequency, which is generated by the sweep generator 42, and is also called floating frequency. When the image B passes the photoelements F1–Fn, it causes a variation in the photostream from the photoelements F1–Fn. By means of suitable signal processing, for example amplification and low-pass filtration, like in this embodiment, signals by pulses are obtained from the photoelements. Low-pass filtration implies that interfering high-frequency phenomena, such as the opening and closing of the optical cell 31, which takes place at transmission change frequency, or the twinkling of fluorescent lamps (mains frequency) are filtered away and do not result in a false indication. The signals from the low-pass filtration are summed up and amplified in the summation ampliflier 24, whose output signal in the signal processor 25 is used for comparison with a threshold value which corresponds to a predetermined value of the second average frequency. When the threshold value is being passed, the signal processor 25 sends a stop signal to the sweep generator 42. If the threshold value corresponds to the frequency 0 Hz, the transmission change frequency conforms with the first average frequency, i.e. the rotary frequency of the object 10, the value of which can therefore be read on the first display 44. At the same time, the image B is frozen, i.e. it becomes completely stationary.

The observed periodical motion of the object 10 is not always strictly periodical, owing to variations in the operating voltage, wobbling, interference etc. depending on what object is involved. In such cases, there is no exact frequency to be sought by means of the sweep generator 42, i.e. there is no frequency at which the image B is frozen, but it will all the time move slowly in any direction. The instrument then produces an actual average frequency. However, it may be difficult to lock the sweep onto a certain frequency at all. It is then suitable to determine a threshold value corresponding to a predetermined value which differs from zero, of the second average frequency. The signal processor 25 then stops the sweep when the second average frequency is lower than the predetermined value.

In its simplest embodiment, the signal processor 25 is an amplitude comparator which detects when the amplitude of the signal by pulses from the summation amplifier 24 exceeds a predetermined threshold value. In such an embodiment, use is made of the fact that the signals from the low-pass filtration have a comparatively low amplitude when the image B quickly passes across the photoelements. The slower the rotation of the image B, the higher said amplitude. The choice of the threshold value therefore determines how slowly the image B of the object must rotate for the comparator 25 to make a detection.

In this preferred embodiment, the image analyser 20 also comprises the second frequency counter 26 and the second display 27. These are used to indicate the second average frequency. If the sweep is stopped at a frequency which is not exactly equal to the frequency of the motion of the object 10, or if this frequency varies with time, this is apparent from the indication on the second display 27. The use of the second frequency counter 26 results in increased accuracy since this frequency counter can be made very accurate as it needs to operate at low frequencies only thanks to the frequency reduction provided by the optical window. The determination of the second average frequency can, of course, be effected by the signal processor 25 if this is more advanced than the one described above.

It should be emphasised that a different choice of components, such as rapid photoelements and a more advanced signal processor, may allow the second average frequency to be fairly high. Furthermore, the sweep may, if needed, be locked onto a harmonic, in which case two or more stationary spokes are to be seen in the image B.

It should also be noted that it may be preferable that the optical window is shifted between said two different transmission levels in such a manner that the open part of a period or cycle is shorter than the closed part to achieve a better contrast. The relationship between the duration of the open period part and the duration of the closed period part may be variable, and also continuously variable during the actual measuring operation for achieving an optimum contrast and freezing of the image. If, for instance, the test object is intensely illuminated, it is possible to let the window be open for a relatively short time, thereby obtaining a good freezing of the image without the image being "smeared" over the surface. In case of a darker test object, it is instead possible to choose a longer opening time during a cycle.

Two displays are not absolutely necessary, but the results can, of course, be presented on the same display, in which case also the sum of the two measured frequencies, which constitute the measured value of the frequency of the motion of the object, can be shown.

For instance, the photodetector may have the photoelements arranged in a circle, in a row, in a matrix. Moreover, it may consist of photodiodes, CCD arrays or be of some other suitable type.

I claim:

1. An instrument for measuring an essentially periodic motion of an object which has a first average frequency, comprising:

an optical window for producing an image of the object, said optical window comprising liquid crystals which can be electrically controllable between different states of transmissions;

an electric driving means for accomplishing a periodic transmission change of the optical window, corresponding to the motion of the object, between a state with relatively low transmission and a state with relatively high transmission, such that a motion having a second average frequency, which is lower than said first average frequency, is effected in the image of the object;

an electronic image-analyzing means for receiving the image of the object via the optical window;

means for changing the frequency of the transmission change; and wherein the image-analyzing means indicates when the second average frequency falls below a predetermined value.

2. An instrument as claimed in claim 1, further comprising:

means for finding and locking onto the frequency or frequencies of the transmission change at which the second average frequency falls below the predetermined value.

3. An instrument as claimed in claim 2, wherein the image-analyzing means comprises a detector for detecting the motion of the image and a signal processor which is connected to the detector and adapted to determine when the second average frequency falls below the predetermined value.

4. An instrument as claimed in claim 2, wherein the instrument further comprises:

means for indicating a measured value corresponding to the frequency of the transmission change.

5. An instrument as claimed in claim 2, wherein the optical window comprises at least one electro-optical cell with C*-type ferroelectric, smectic liquid crystals.

6. An instrument as claimed in claim 2, wherein the optical window comprises at least one electro-optical cell with A*-type paraelectric, smectic liquid crystals.

7. An instrument as claimed in claim 1, wherein the image-analyzing means comprises a detector for detecting the motion of the image and a signal processor which is connected to the detector and adapted to determine when the second average frequency falls below the predetermined value.

8. An instrument as claimed in claim 7, wherein the detector comprises a photodetector and means connected to the photodetector for low-pass filtration.

9. An instrument as claimed in claim 8, wherein the means for changing the frequency of the transmission change is a sweep generator, the frequency sweeping of which is stopped by the signal processor when it determines that the second average frequency falls below the predetermined value.

10. An instrument as claimed in claim 8, wherein the instrument further comprises:

means for indicating a measured value corresponding to the frequency of the transmission change.

11. An instrument as claimed in claim 8, wherein the optical window comprises at least one electro-optical cell with C*-type ferroelectric, smectic liquid crystals.

12. An instrument as claimed in claim 7, wherein the means for changing the frequency of the transmission change is a sweep generator; and wherein the frequency sweeping of said sweep generator is stopped by the signal processor when it determines that the second average frequency falls below the predetermined value.

13. An instrument as claimed in claim 7, wherein the instrument further comprises:

means for indicating a measured value corresponding to the frequency of the transmission change.

14. An instrument as claimed in claim 7, wherein the optical window comprises at least one electro-optical cell with C*-type ferroelectric, smectic liquid crystals.

15. An instrument as claimed in claim 7, wherein the optical window comprises at least one electro-optical cell with A*-type paraelectric, smectic liquid crystals.

16. An instrument as claimed in claim 1, wherein the instrument further comprises:

means for indicating a measured value corresponding to the frequency of the transmission change.

17. An instrument as claimed in claim 1, wherein the optical window comprises at least one electro-optical cell with C*-type ferroelectric, smectic liquid crystals.

18. An instrument as claimed in claim 1, wherein the optical window comprises at least one electro-optical cell with A*-type paraelectric, smectic liquid crystals.

19. A method for measuring an essentially periodic motion of an object which has a first average frequency, comprising the steps of:

producing an image of the object by means of an optical window, which comprises liquid crystals to be electrically controllable between different states of transmission;

accomplishing a periodic transmission change of the optical window, corresponding to the periodic motion, between a state with relatively low transmission and a state with relatively high transmission, such that a motion having a second average frequency which is lower than said first average frequency, is effected in the image of the object;

a) receiving the image of the periodic motion of the object by an electronic image-analyzing means, via the optical window; and indicating when the second average frequency falls below a predetermined value.

20. A method as claimed in claim 9, step a) comprises the steps of b) receiving the image by means of a photodetector included in the image-analyzing means;

c) low-pass filtering an output signal from the photodetector and generating a low-pass filtered output signal; and d) determining by means of the low-pass filtered output signal whether the second average frequency falls below the predetermined value.

21. An instrument for determining a first frequency of rotation of an object, said instrument comprising:
   an optical window including a plurality of electro-optical cells;
   a driving circuit connected to said electro-optical cells to transition said electro-optical cells between a first state in which said optical window is substantially transmissive relative to radiation which illuminates said object, and a second state in which said optical window is substantially opaque relative to said radiation;
   a detector which receives said radiation when said optical window is in said first state and which generates an image of said object therefrom; and
   means for varying a second frequency of transitions between said first and second states of said electro-optical cells;
   wherein said first frequency is determined by said second frequency when said detector indicates that said image is substantially motionless.

22. The instrument of claim 21, wherein said detector comprises:
   a photodetector; and
   means connected to the photodetector for low-pass filtration.

23. The instrument of claim 21, wherein said electro-optical cells comprise either C*-type ferroelectric, smectic liquid crystals or A*-type paraelectric, smectic liquid crystals.

* * * * *